United States Patent [19]
Wyeth et al.

[11] 3,778,214
[45] Dec. 11, 1973

[54] APPARATUS FOR PREPARING A BIAXIALLY ORIENTED THERMOPLASTIC ARTICLE

[75] Inventors: Nathaniel Convers Wyeth, Mendenhall, Pa.; Ronald Newman Roseveare, Lynchburg, Va.

[73] Assignee: E. I. du Pont de Nemours and Company, Wilmington, Del.

[22] Filed: June 14, 1972

[21] Appl. No.: 262,593

Related U.S. Application Data

[60] Division of Ser. No. 93,571, Nov. 30, 1970, Pat. No. 3,733,309, which is a continuation-in-part of Ser. No. 885,853, Dec. 17, 1969, abandoned.

[52] U.S. Cl.......... 425/326, 425/387, 425/DIG. 206
[51] Int. Cl............................................. B29d 23/03
[58] Field of Search.................... 425/326, 387, 249, 425/DIG. 203, DIG. 206

[56] References Cited
UNITED STATES PATENTS

| | | | |
|---|---|---|---|
| 3,288,898 | 11/1966 | West................................ | 425/326 X |
| 2,706,308 | 4/1955 | Lorenz............................. | 425/326 X |
| 2,810,934 | 10/1957 | Bailey.............................. | 425/326 X |
| 3,002,225 | 10/1961 | Goller.............................. | 425/387 X |
| 3,160,130 | 12/1964 | Pesak............................... | 425/387 X |
| 3,281,514 | 10/1966 | Polka............................... | 425/468 X |
| 3,301,928 | 1/1967 | Plymale........................... | 425/468 UX |
| 3,337,910 | 8/1967 | West................................ | 425/387 X |
| 3,349,155 | 10/1967 | Valyi................................ | 425/468 X |
| 3,433,862 | 3/1969 | Weber.............................. | 425/249 X |

Primary Examiner—J. Spencer Overholser
Assistant Examiner—Michael O. Sutton
Attorney—Louis Del Vecchio

[57] ABSTRACT

Apparatus for preparing a biaxially oriented thermoplastic article, particularly a bottle useful in bottling liquids under pressure such as carbonated beverages. The apparatus is comprised of a sliding mold, an annular extrusion orifice located within the mold cavity, means for extruding a hollow slug through the extrusion orifice, means in the mold to accept the extruded slug, means for sliding the mold from a first location to a second location relative to the extrusion orifice while the slug is continuously extruded to draw the extruded slug into the interior of the mold forming a hollow shell out of the extrudate, and means to introduce a fluid into the interior of the hollow shell while the slug is being extruded to expand the hollow shell against the interior of the mold.

31 Claims, 13 Drawing Figures

FIG. 3
FIG. 4
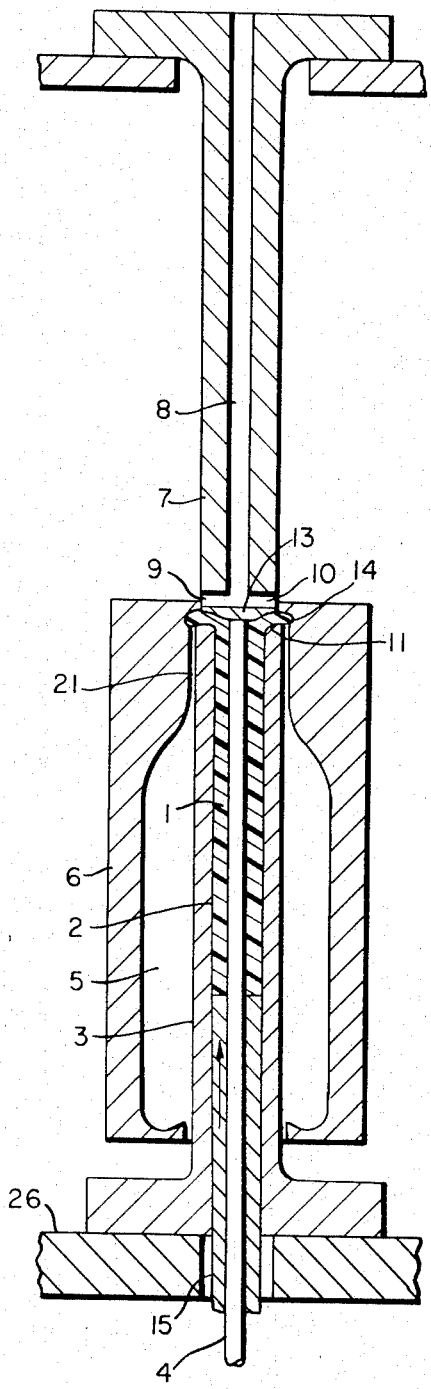
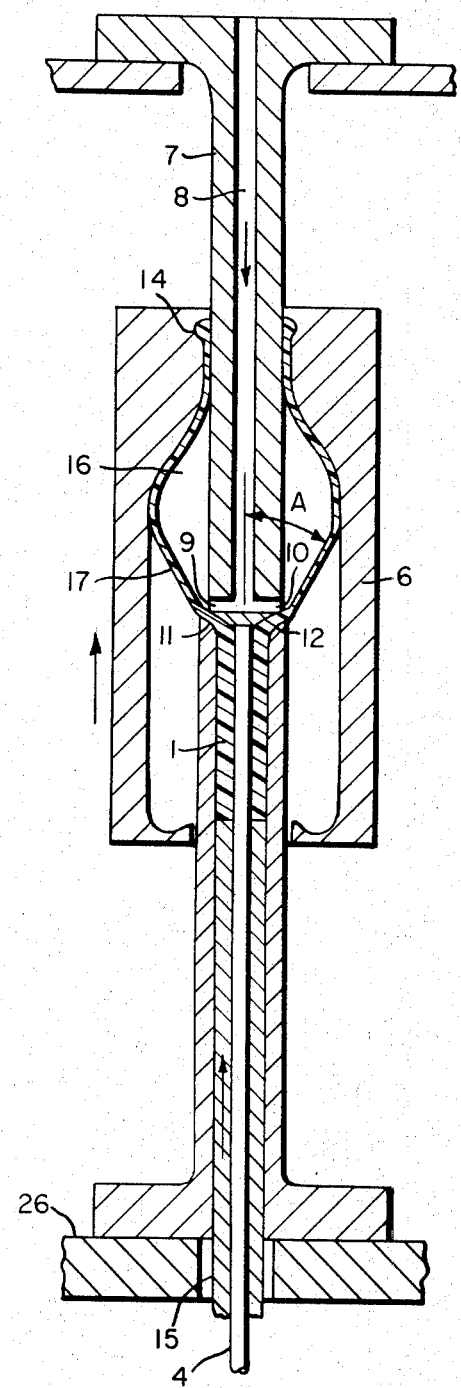

3,778,214

APPARATUS FOR PREPARING A BIAXIALLY ORIENTED THERMOPLASTIC ARTICLE

CROSS REFERENCE TO RELATED CASE

This application is a division of U. S. Pat. application Ser. No. 93,571, filed Nov. 30, 1970, now U.S. Pat. No. 3,733,309 which is in turn a continuation-in-part of U. S. Pat. application Ser. No. 885,853, filed Dec. 17, 1969, now abandoned.

BACKGROUND OF THE INVENTION

This invention relates to an apparatus for preparing molecularly oriented thermoplastic articles and particularly bottles useful in containing liquids under pressure such as sodas, beer and aerosols.

In preparing the thermoplastic articles, it is desirable to minimize the amount of thermoplastic polymer used to make the article while still maintaining properties in the article sufficient to render the article useful for its intended purposes. For example, in a bottle for use in containing liquids under pressure, it is desirable to make the shell as thin as practical while still retaining sufficient strength in the shell to contain the liquid and the internal pressure.

One way of improving the physical strength properties of a crystallizable thermoplastic is to molecularly orient the thermoplastic polymer thereby permitting the use of reduced amounts of polymer for the equivalent strength properties otherwise exhibited by a relatively increased amount of unoriented polymer. Orientation can be accomplished by stretching the polymer at the orientation temperature of the polymer, i.e., below its crystalline melting point. While stretching is accomplished rather easily on a flat sheet, it is difficult to accomplish on a shaped article such as a bottle; and it is particularly difficult to biaxially orient such an article.

There is a need, therefore, for a practical and efficient apparatus for producing a biaxially oriented, shaped, thermoplastic article having improved strength properties.

SUMMARY OF THE INVENTION

Accordingly, the present invention provides an apparatus for producing a hollow, biaxially oriented, thermoplastic article having improved strength properties.

The apparatus of this invention consists essentially of:

a. a slidable mold having a cavity shaped to reproduce a desirable article, b. an annular extrusion orifice located within the mold cavity, c. means for extruding a hollow thermoplastic slug through the annular extrusion orifice into the mold, d. means in the mold to accept and hold the extrudate at one end of the mold cavity, e. means for sliding the mold from a first location to a second location relative to the extrusion orifice while the thermoplastic slug is continuously extruded and drawn into the interior of the mold forming a hollow shell out of the extrudate, f. means for introducing a fluid against the interior of the hollow shell, while the slug is simultaneously being extruded and drawn, to expand the hollow shell of extrudate against the interior of the mold, and, if needed as when using an open-ended slug, g. means for urging the trailing edges of the slug radially inward toward the center of the article forming an integral closure.

DESCRIPTION OF THE DRAWINGS:

FIG. 3 is a fragmentary cross-sectional view of the apparatus of this invention positioned during the initial stage of forming a hollow article and specifically showing an annular bead being formed.

FIG. 4 is a fragmentary cross-sectional view of the apparatus of this invention positioned during the intermediate stage of forming a hollow article and specifically showing the crucial step of combined nonmolten extrusion and expansion by use of internal fluid forces.

DETAILS OF THE INVENTION

Figure 5:
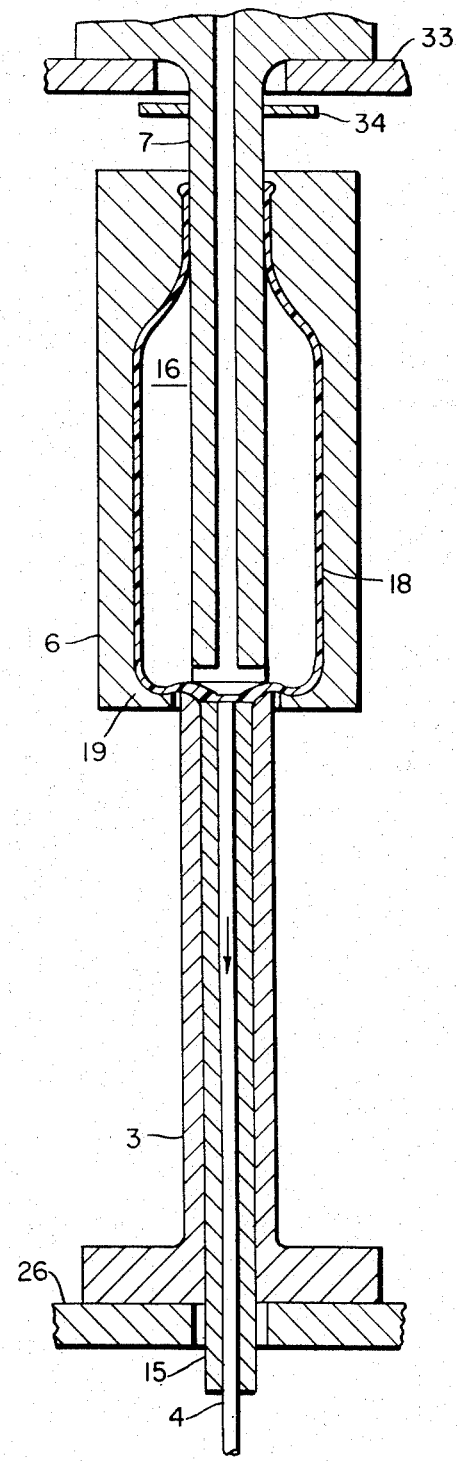
FIG. 5 is a fragmentary cross-sectional view of the apparatus of this invention positioned after the hollow article has been completely formed.

The apparatus of this invention useful in preparing thermoplastic articles will be described in detail with the aid of the drawings. Referring to FIGS. 3 to 5, a hollow, cylindrically shaped, thermoplastic polymeric slug 1 described below is first placed in an extrusion chamber 2 formed by the bore of an extrusion barrel 3 and the outside cylindrical surface of a center supporting rod 4. A mold cavity 5 of mold 6 has an internal configuration such as the shape of the article desired and is positioned in a first location surrounding the extrusion barrel 3 as is particularly shown in FIGS. 1 and 3. The mold cavity 5 illustrated in FIG. 3 is one for use in fabricating a narrow neck bottle such as can be employed in bottling carbonated beverages.

The extrusion barrel 3 is in axial alignment with a mandrel 7 having a uniform outside diameter that is substantially the same as the inside diameter of the neck of the bottle being fabricated. A fluid passage 8 is contained within the mandrel 7 having fluid exit ports 9 and 10 at the end of the mandrel 7 that is in closest proximity to the extrusion barrel 3. Situated between the end of the barrel 3 and the end of the mandrel 7 is an annular extrusion orifice 11. This office can conveniently be formed by rounded end 12 of the extrusion barrel 3 and annular flared piece 13 which is attached to the body of the mandrel 7.

Figure 6:
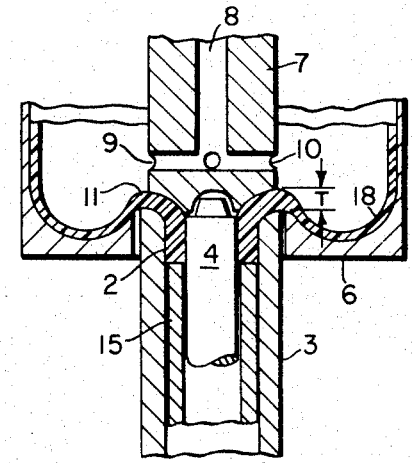
FIG. 6 is an enlarged fragmentary cross-sectional view of a portion of the positioned apparatus shown in FIG. 5 showing in greater detail the region around the annular extrusion orifice near the completion of the combined extrusion and expansion operation.
Figure 7:
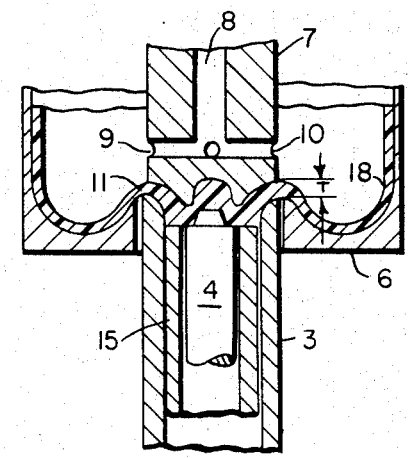
FIG. 7 is an enlarged fragmentary cross-sectional view similar to that of FIG. 6 but showing the region around the annular extrusion orifice upon the completion of the hollow article formation.

The annular extrusion orifice 11, shown in detail in FIGS. 6 and 7, is defined by the confronting end portions of the extrusion barrel 3 and the mandrel 7. In cross-sectional profile, wherein the cross section is taken coplanar with the central axis of extrusion, as shown in FIGS. 6 and 7, both members are machined with a curving shape to provide a smooth transition from the annular extrusion chamber 2 outwardly and to provide a boundary for the annular extrusion orifice 11 such that the orifice is always convergent in its cross-sectional area. The orifice becomes progressively smaller in the direction of flow out to the outer boundary of its extrusion annulus which is proximate to the periphery of the mandrel 7 from which the polymer emerges from the annular extrusion orifice 11 to enter the cavity 5 of the mold 6. Since the orifice is convergent in the direction of extrusion, it follows that the cross-sectional area of the orifice taken perpendicular to the direction of extrusion can either be the same or decrease in the direction of extrusion.

Referring to FIG. 6, the dimension of the orifice 11 measured axially is shown as "T." In this figure, as in FIG. 7, the size of this dimension is enlarged for descriptive reasons. In an actual apparatus, the dimension "T" can range from about 0.01 to 0.075 inch depending on the characteristics of the polymer being formed and on the degree of orientation to be imparted. The orifice serves as the locus for high rate work input to the polymer that raises the temperature of the polymer to the orientation temperature range of the polymer, insuring good orientation characteristics. In general, the degree of orientation of the extrudate increases as the ratio increases between the average diameter of the extrudate as it emerges from orifice 11 and the average diameter of the slug.

The annular extrusion orifice 11 is area-convergent, as shown, in order to insure stable flow and a finite pressure drop between chamber 2 and the outer part of the orifice 11 during extrusion and especially at the time closing of the end of the bottle article is initiated; stated somewhat differently, a high pressure in the chamber 2 at the instant that the rod 4 is withdrawn, assures that polymer will flow inwardly from the chamber 2 (with the continued urging of the ram 15), effecting a closure.

The mold cavity 5 has an annular groove 14 within its contour that is initially located adjacent to the discharge side of the annular extrusion orifice 11. The mold 6 with its mold cavity 5 can also be moved from the first location shown in FIG. 3 to a second location shown in FIG. 5.

Figure 1:
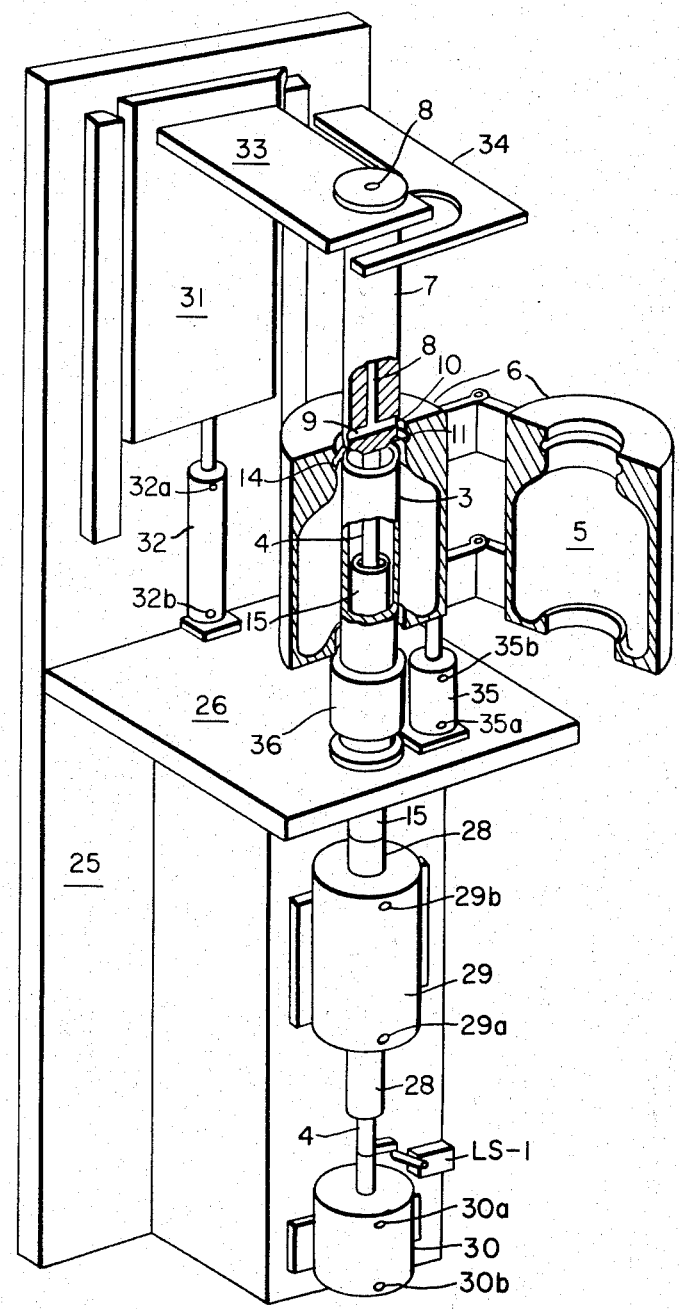
FIG. 1 is a perspective view of the apparatus of this invention, including means for actuating moving parts of the apparatus.
Figure 2:
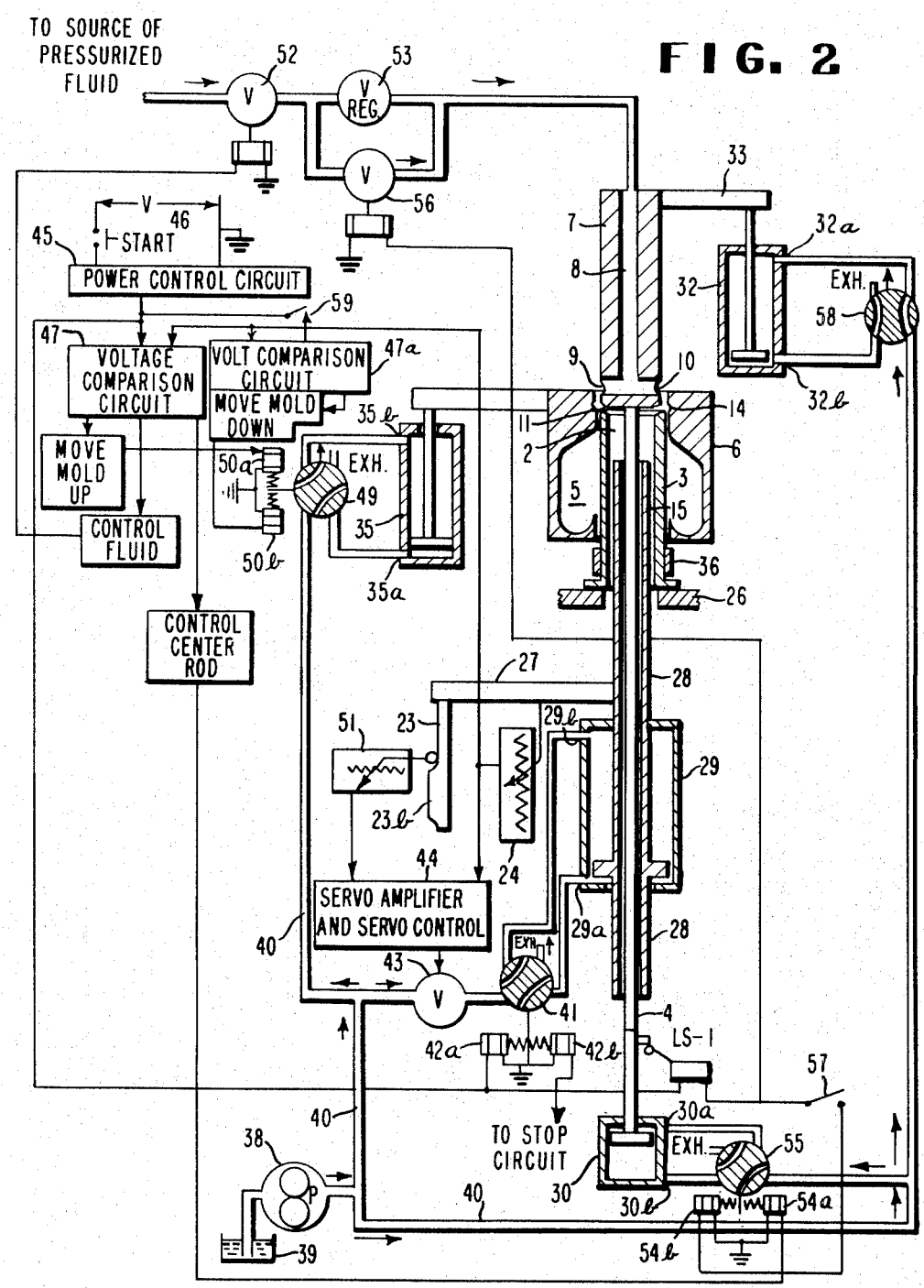
FIG. 2 is a schematic diagram of the principal parts of the apparatus of FIG. 1 showing hydraulic, fluidic and electrical circuits for actuating and controlling the apparatus.

Referring to FIGS. 1 and 2, the means for moving the various parts of the apparatus generally comprise hydraulic cylinders or hydraulic motors which are situated on a frame 25. The extrusion barrel 3 is flange mounted on a shelf 26 and is concentrically aligned with the hollow extrusion ram 15 which operates through an opening, not shown, in the shelf 26. Beneath the shelf 26 the ram 15 is aligned with and joined to the hollow tubular piston rod 28 of a non-differential, or double extended type, hydraulic motor 29 which is secured to the frame 25. Inside the bore of the extrusion ram 15 is the center supporting rod 4 which extends from the top of the extrusion barrel 3 entirely through the extrusion ram 15 and the tubular piston rod 28. Beneath the lower end of the piston rod 28 the center supporting rod 4 is joined to the piston rod of another hydraulic motor 30 which is likewise secured to the frame 25.

At the upper end of the frame 25 is a dovetail slide 31 arranged to be moved parallel to the axis of the barrel 3 by means of a hydraulic motor 32 the body of which is secured to the shelf 26. Joined to the slide 31 is beam 33 which supports the mandrel 7 in axial alignment and spaced relationship with the extrusion barrel 3. Extending outward from the frame 25 is a fixed bifurcated stripping fork 34, the tines of which straddle the mandrel 7 directly beneath the beam 33. The mandrel 7 can be raised vertically by means of the motor 32 to effect the stripping of a formed container, not shown, from the mandrel. Additionally, this action exposes the extrusion chamber 2 in the barrel 3 to permit the insertion of a new slug of plastic.

Surrounding both the mandrel 7 and the extrusion barrel 3 is a pieced mold 6 having apertures in its upper and lower extremities axially aligned with and slidable on both of these members. Mold 6 is movable vertically by use of hydraulic motor 35 the body of which is secured to the shelf 26. In FIGS. 1 and 2, the mold 6 is shown in its lowermost location, positioned for the initiation of a cycle. The mold 6 comprises two generally symmetrical halves with a planar parting face. The halves are hinged as shown in FIG. 1 but could be mounted on slides or links to permit the opening and closing on the extrusion barrel 3 and the mandrel 7. It should be understood that a movable clamping means, not shown, must be provided to secure the halves of the mold to each other to resist internal pressures of considerable magnitude. Such clamping means are well known in the art and generally comprise latches, pneumatic or hydraulic motors, screw clamps or the like. It will be understood that the mold walls may be made porous.

The mold parts may require heat or refrigeration depending on the material of the slug and may be provided with individual jackets or passages, not shown, for electrical or fluid heating or cooling. The extrusion barrel 3 may also require heat or refrigeration and jacket 36 is shown surrounding the part of the extrusion barrel 3 that is accessible beneath the mold 6. If desired, the mandrel 7 can be equipped similarly.

Referring to FIG. 2, the hydraulic motors are controlled sequentially by means of several solenoid operated valves and an electrical control circuit. A gear pump 38 supplies fluid under pressure from a sump 39 to a plurality of conduits 40. The principal hydraulic motor is motor 29 which drives the ram 15 at a velocity determined by the profile of the cam 23. Cam 23 is carried on arm 27 by the rod 28 and is used to position a potentiometer 51 to produce a position-indicative output voltage. This output voltage is fed to servo control 44 which, in turn, controls the operation of the valve 43 by varying the rate of flow of fluid to the motor 29 via valve 41 in proportion to the output voltage, the voltage and the fluid flow being higher when the high part 23b of the cam 23 is reached. The valve 41 is a self-centering four-way solenoid valve having ports which are blocked as shown when the solenoids are not energized. When the solenoid 42a is energized, the valve 41 swings clockwise admitting fluid to port 29a of motor 29 while simultaneously opening port 29b to "exhaust," thus permitting fluid in the upper part of motor 29 to return to the sump 39 via a conduit, not shown. The admission of fluid to port 29a causes the ram 28 to be driven upward. When the opposite solenoid 42b is energized, the valve 41 will move counterclockwise and drive the ram 28 down again.

The arm 27 on piston rod 28 also drives the movable part of a potentiometer 24 which produces and output voltage proportional to the position of the rod 28 and ram 15 and varies in magnitude. This varying signal is used for controlling several events to be described. The system is activated by means of a power control circuit 45 which supplies electrical energy from source 46 directly to solenoid 42a on valve 41 and simultaneously to voltage comparison circuit 47 which also receives the input voltage from the potentiometer 24. The circuit 47 is adapted to produce three different outputs sequentially depending on the magnitude of the voltage output of the potentiometer 24 which depends on the position of the rod 28 of the motor 29. Thus, as the rod and ram move, the following events occur in sequence:

1. The mold 6 is set in motion upward at a constant velocity by means of motor 35 via valve 49 which is actuated by solenoid 50a.

2. A short time later, pressurized fluid is admitted via solenoid valve 52 and needle valve 53 to mandrel 7, passage 8 and ports 9 and 10 at a controlled rate of flow.

3. Near the end of the stroke of the ram 15, the mold stops at the end of the stroke of cylinder 35 and the center supporting rod is then triggered into action by a signal from circuit 47 to solenoid 54a. This causes valve 55 to admit pressurized fluid to the upper port 30a of motor 30 thus causing the center supporting rod 4 to be pulled downward. It should be understood that the stroke of the motor 30 is very short, such as 0.1 to 0.2 inch. Thus, this motor and the rod 4 quickly "bottom" in the downward direction and maintain this position.

As the rod 4 moves downward, a lug on the rod engages limit switch LS-1 which then causes valve 56 to be energized to the opened position. This action bypasses the needle valve 53 and admits fluid into mandrel 7 and ports 9 and 10 at a a greater rate than before. As an optional mode of operation of motor 30, as the limit switch LS-1 is closed, the solenoid 54b may be energized via switch 57. This causes valve 55 to turn clockwise, exhausting fluid from the upper port 30a of the motor 30 and admitting pressurizied fluid to the lower port 30b of the motor. Thus, in a very short period of time rod 4 is pulled down, limit switch LS-1 is actuated and the rod 4 is urged upward again.

At the start of a cycle or at any time after a cycle has been completed, the mold 6 may be opened and the mandrel 7 may be withdrawn upward by use of motor 32. Valve 58 may be turned manually from the "rest" position shown to a position in which pressurized fluid is admitted to port 32b thereby driving motor 32 and mandrel 7 upward to effect a stripping operation. At this stage, mold 6 and the ram 15 are in their uppermost positions. They are retracted by de-energizing the power control 45. This energizes solenoids 50b and 42b momentarily, causing valves 49 and 41 each to turn to admit pressurized fluid to the upper ends of motors 35 and 29, respectively, and causing them to drive "down." The solenoids are then de-energized which permits the valves 49 and 41 to return to their "centered" position with all ports closed. The extrusion chamber 2 in extrusion barrel 3 is again ready to receive a fresh slug after which the mandrel 7 may be lowered by use of motor 32 and valve 58.

Precision control of the movable parts of the apparatus of this invention is achieved electronically by the control means shown in FIG. 2. For example, immediately after the formation of the bead in annular groove 14, the mold 6 is set in motion at a constant velocity when the voltage comparison circuit 47 senses a preselected level of voltage output at the potentiometer 24 when the ram 15 has gone through a preselected stroke of about 0.5 to 1.2 inches. In the first increment of mold motion, the annular bead moves along and over the end of the mandrel 7 causing the extrudate to cover the ports 9 and 10. With continued mold motion, the voltage comparison circuit 47 senses a different preselected level of voltage from potentiometer 24, triggering valve 52 and admitting fluid at a preselected rate through valve 53. This expands part of the neck portion of the extrudate outwardly against the mold surface in annular space 21.

As movement of extrusion ram 15 and mold 6 continues, the neck portion is completed and the diverging part of the mold cavity 5 begins to pass beyond the region where the ports 9 and 10 are located, thus permitting newly extruded plastic to be expanded to a greater degree than in the neck portion as generally shown in FIG. 4. At this stage, when the polymer has reached, or is beginning to reach, the largest part of the mold 6, the ram 4 and rod 28 have advanced to the point where the high part 23b of the cam 23 drives the potentiometer 51 to a different position causing valve 43 to open to a greater degree. This admits fluid at a greater rate to motor 29 which increases the rate of extrusion of polymer through orifice 11 and contributes more polymeric material to the outermost wall of the article being formed.

As the ram 15 nears the end of its stroke, the potentiometer 51 returns once again to a lower level position on cam 23 so that the rate of extrusion of polymer through orifice 11 is decreased; this occurs substantially as the wall of the article is being completed and the bottom is to be formed and results in a thinner bottom.

Similar precision control is achieved just before the mold comes to a stop. The center supporting rod is triggered into action when the voltage comparison circuit 47 senses a preselected level of voltage from potentiometer 24 at which point solenoid 54a is energized and valve 55 operates admitting fluid to port 30a of motor 30. This starts to pull rod 4 away from abutment with the end of mandrel 7 and causes actuation of limit switch LS-1. This action triggers solenoid valve 56 thus by-passing valve 53 and admitting pressurized fluid to cavity 16 at a greater rate than before. This effects the completion of the expansion of the extruded shape in a shorter time than if valve 53 continued to control the rate of ingress of fluid.

Additionally, if desired, switch 57 may have been closed so that actuation of switch LS-1 would have the added effect of reversing valve 55 so that a very short time after its withdrawal, the rod 4 would have thrust toward mandrel 7. The space formerly occupied by the tip of the rod 4 is then occupied by polymer which, by this action, is subjected to an impact squeezing effect in coordination with the urging of the ram 15. This mode of operation is preferred since the simultaneous actions result in a sound, high density closure.

An alternate mode of operation is particularly suited for polymers which, after drawing or orienting, exhibit poor conformability to a mold especially in the final stages of forming a container, in the present situation, the blowing and forming of the bottom of the container. This mode of operation comprises essentially the mode described above with an added step of reforming the bottom of the container inwardly to form a concave recess. This is accomplished by the apparatus of FIG. 2 in which the voltage comparison circuit 47a is energized optionally by a switch 59; the circuit 47a also receives the voltage output of potentiometer 24 and is adapted to control "down" movement of the mold 6 via solenoid 50b of valve 49 in a manner to be described.

As described previously, travel of mold 6 in the upward direction during the forming of a container is controlled by voltage comparison circuit 47 which, when it senses that the output voltage of potentiometer 24 has reached a pre-set value, de-energizes solenoid 50a, restoring valve 49 to its "centered" position, thus stopping hydraulic motor 35. Ordinarily, the mold would continue to occupy the position at which it stopped; however, in the presently described mode of operation, at the instant that the solenoid 50a is deenergized, the voltage comparison circuit 47a (switch 59 closed), receiving the same voltage from potentiometer 24, acts to energize solenoid 50b; the latter actuates valve 49 to admit fluid to port 35b of hydraulic motor 35 thereby driving the mold 6 "down" again immediately. The voltage comparison circuit 47a after a short time delay de-energizes solenoid 50b, the mold 6 having moved through a short stroke (e.g., about 0.5 inch). When the solenoid 50b is de-energized the valve 49 becomes "centered" once again and the mold 6 comes to a stop.

Figure 8:
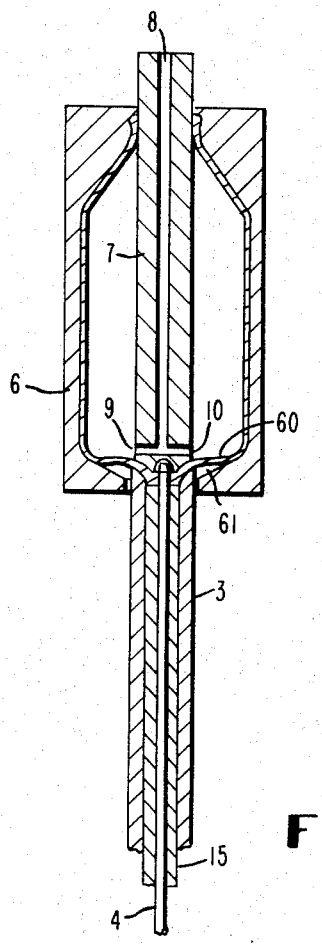
FIGS. 8 and 9 are fragmentary cross-sectional views of the apparatus of the invention adapted to handle polymers with poor conformability to the mold.
Figure 9:
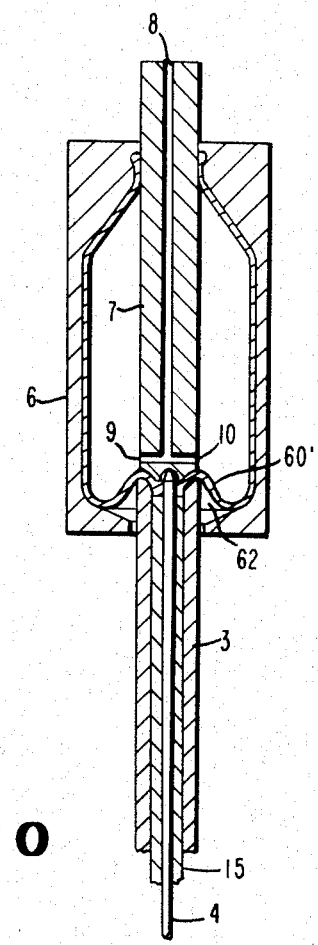
Figure 10:
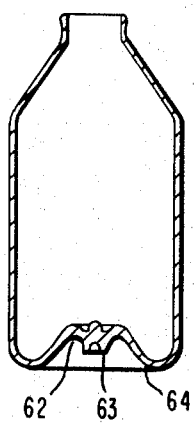
FIG. 10 is a bottle formed in the apparatus of FIG. 9.

The final steps in the forming of the plastic container, according to this mode of operation, are shown in FIGS. 8 and 9. In FIG. 8, the container is substantially complete with the mold 6 at the upward limit of its travel except that the plastic wall 60 has not conformed to the entire bottom portion of the mold, leaving a void 61 between plastic and mold. The next step, shown in FIG. 9, comprises moving the mold downward a short distance (e.g., 0.5 inch) to deform the plastic into a reverse bend and to form a truncated conical recess 62 in the bottom portion; during this step the generally conical wall 60' is stretched, imparting additional orientation to the conical wall 60'. It will be realized that the next and final step comprises close-off of the aperture occupied by the tip of the center supporting rod 4, a process step that has previously been described. The axial depth of the recess 62 or the downward stroke of the mold 6 is usually made great enough so that the plastic surface 63, FIG. 10, is either coplanar with the surface 64 or is slightly above it thus assuring stability when the container surface 64 rests on a support. The generally conical recess 62 serves the purpose of increasing the strength of the bottom of the container, improving its ability to resist internal pressures while minimizing the amount of plastic material needed for this purpose.

In operation, the apparatus of this invention is used in the following manner: A thermoplastic polymeric slug 1 is placed within the extrusion chamber 2. Extrusion ram 15 is activated so as to force part of the non-molten thermoplastic polymeric material of the slug 1 through the annular extrusion orifice 11 and into the annular groove 14 in the end of the mold cavity 5. This first stage of extruding an annular bead from the thermoplastic slug 1 is shown in FIG. 3. It is seen that the first part of the slug 1 to leave the annular extrusion orifice 11 and enter the annular groove 14 forms a bridge or diaphragm around the entire upper part of the annular space 21 between the outside of the extrusion barrel 3 and the inside of the mold cavity 5 thereby effecting a seal. The extrusion of the slug into the groove 14 enables, in subsequent steps, the imposition of axial tension on the extrudate by moving the mold to stretch or draw the extrudate.

Immediately after the completion of the formation of the bead within the mold cavity 5 and in simultaneous sequence with the continued movement of the extrusion ram 15, the mold 6 is moved at a uniform rate of speed and a fluid such as compressed air or liquid being packaged is forced through into the fluid passage 8, out of the fluid exit ports 9 and 10 and into cavity 16. This cavity is formed by the external surface of the mandrel 7, the extruded seal at the annular groove 14 and extruded shape 17 which was extruded by the annular extrusion orifice 11 and expanded by the compressed air from the fluid exit ports 9 and 10. This is shown in FIG. 4.

Thus, as mold 6 moves relative to the orifice 11, the bead formed in annular groove 14 anchors the newly formed bottle top to the mold 6 and effectively moves the fresh extrudate past the compressed air flowing from exit ports 9 and 10, thereby causing an almost immediate forcing of that extrudate against the wall of mold cavity 5 as it emerges from orifice 11.

The presently preferred method is centered on the production of a thermoplastic article having a nonuniform shell thickness due to the face that the rate of extrusion and the speed of the mold are held constant while the mold itself has a varying shape. Shell thickness can be controlled by properly programming the apparatus to obtain either a uniform or a non-uniform thickness. Methods of programming shell thickness include varying the speed of the sliding mold or varying the extrusion rate of the slug.

The thermoplastic polymeric material of the slug 1 that is extruded through the annular extrusion orifice 11 becomes partially biaxially oriented from the extension operation. The remainder of the desired biaxial orientation of the extruded shape 17 is accomplished as the extrudate is drawn and expanded against the surface of the mold cavity 5 contained within the mold 6. There is a substantial decrease, e.g., up to 50 percent or more, in wall thickness of the extrudate after it has been drawn and expanded.

The slug 1 continues to be extruded through the annular extrusion orifice 11 by the extrusion ram 15 while the mold 6 moves toward the second location over the mandrel 7. The combined action of the extrusion of the slug 1 and the expansion of the extrudate results in the desired shape of the bottle article 18 shown in FIG. 5, but having an unsealed bottom portion as best shown in FIG. 6. The bottom portion of the bottle article 18 is sealed by the withdrawal of the center supporting rod 4 while the mold 6 stops and the extrusion ram 15 continues to exert a force on the remaining polymeric material within the extrusion chamber 2. This is shown in FIG. 5 with the completely formed bottle article 19 which is in a highly biaxially oriented state.

FIGS. 6 and 7 show in greater detail the preferred bottom sealing operation in which the partial withdrawal of the center supporting rod 4 permits polymeric material of the slug, under the continued urging of the extrusion ram 15, to flow inward to effect a closure.

Alternatively, the bottom can be sealed according to the process disclosed in Carmichael, U.S. Application Ser. No. 57,679, filed July 23, 1970, wherein a friction-welded bottom seal on a thermoplastic bottle is effected by contacting the bottom of the thermoplastic bottle in the area immediately adjacent the bottom opening with a rotating friction sealing head to raise the temperature of the thermo-plastic material to about its melting point, working the hot thermoplastic material into and sealing the bottom opening, and thereafter quenching the sealed opening. The process can be carried out while the bottle is still in the mold or in a separate operation after the bottle is removed from the mold.

FIG. 7 shows the location of the parts of the apparatus upon the completion of the method for forming a hollow article from a hollow slug. In FIG. 7 the center supporting rod 4 has been withdrawn while the extrusion ram 15 depressed the remaining portion of the thermoplastic slug into the volume vacated by the repositioned center supporting rod 4.

In an alternate embodiment, the apparatus is modified by providing a moving center rod through the slug instead of a stationary center rod. This permits the use of a closed end or blind hollow thermoplastic slug wherein the closed end becomes the bottom of the article formed, eliminating the need for a separate bottom closure step. In addition, the center rod and slug move at the same rate during extrusion of the slug eliminating relative motion between the slug and the center rod, thereby minimizing the need for lubrication between the center rod and the slug while reducing the wear in the center rod.

Figure 11:
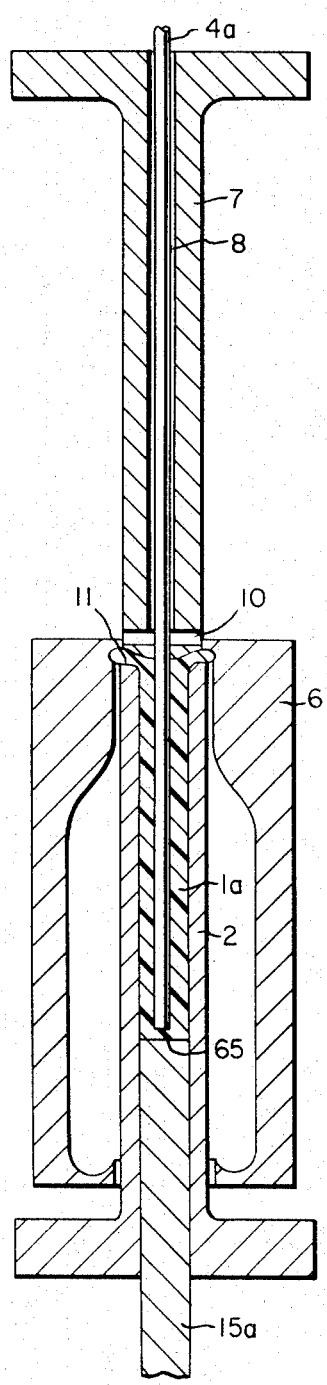
FIG. 11 is a fragmentary cross-sectional view of an alternate embodiment incorporating a sliding center rod with the center rod in its fully extended position.
Figure 12:
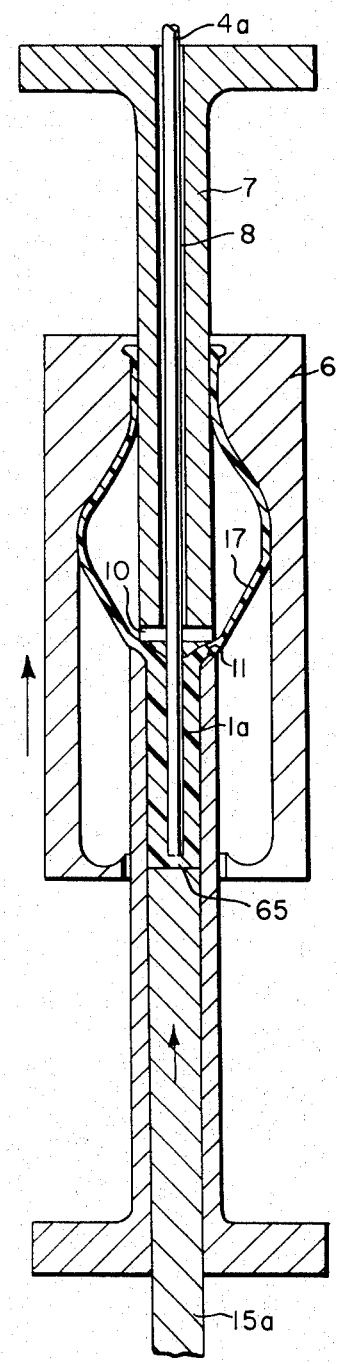
FIG. 12 is a fragmentary cross-sectional view of the alternate embodiment shown in FIG. 11 with the center rod at an intermediate stage of withdrawal corresponding relatively to the intermediate position of the sliding mold.
Figure 13:
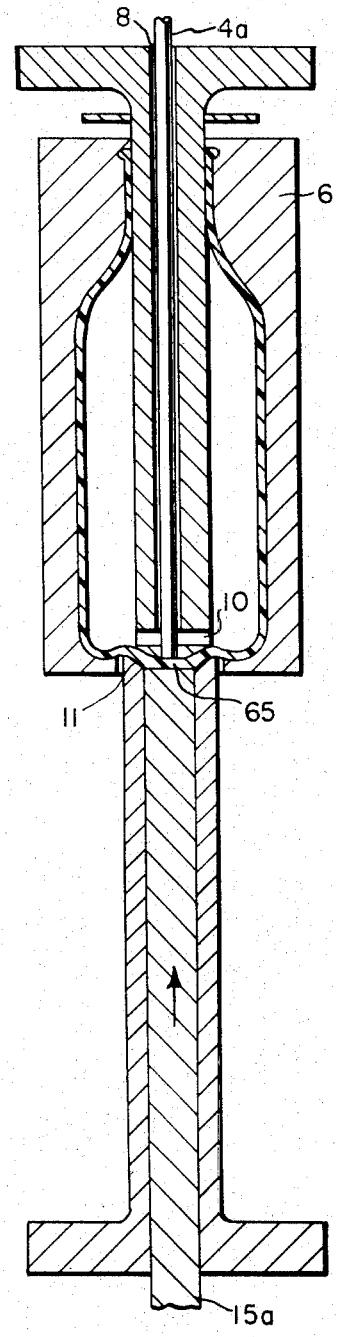
FIG. 13 is a fragmentary cross-sectional view of the alternate embodiment shown in FIG. 11 with the center rod completely withdrawn corresponding relatively to the final position of the sliding mold.

This alternate embodiment is shown in FIGS. 11 to 13 as it is used in the process of this invention. Referring to FIG. 11, a hollow cylindrical slug 1a having a closed end 65 is placed in extrusion chamber 2. Mold 6 is positioned in a first location wherein the mold cavity 5 surrounds extrusion chamber 2. Center rod 4a is positioned inside of slug 1a and extends into fluid passage chamber 8 within mandrel 7. If desired, the center rod can be heated by conventional means not shown, that in turn heats the thermoplastic slug. Extrusion ram 15a is modified to be a solid round bar positioned in extrusion chamber 2 abutting slug 1a containing the center rod 4a. The center rod is biased against the extrusion ram by conventional means not shown, exerting a nominal force against the extrusion ram sufficient to keep the extrusion ram from buckling the slug and to insure steady motion during extrusion. In a typical embodiment, the extrusion ram pressure is about 13,000 psig and the center rod biasing pressure is about 50 psig.

In operation, extrusion ram 15a forces slug 1a out of extrusion chamber 2 through extrusion orifice 11 and around mandrel 7. FIG. 12 shows an article partially formed, wherein the extrusion ram 15a has forced the slug into the sliding mold while simultaneously moving the center rod with the slug so that there is no relative motion between the slug and the center rod. Fluid is introduced through fluid passageway 8 around center rod 4a and out through port 10 into the interior portions of the extruded shell 17 forcing it against the mold cavity thereby shaping the article.

FIG. 13 shows an article completely formed inside of the mold cavity. It can be noted that the bottom of the slug 65 is now the bottom center portion of the article. In addition, that portion of the center rod 4a that originated in the slug while the slug was in the extrusion chamber has been moved into fluid passageway 8.

After the thermoplastic article is formed, it can be heat treated by well known processes to increase the crystallinity level, thereby decreasing the ability of the gases to permeate the shell and improving dimensional stability which is important if the article is used to bottle hot beverages or is to be subjected to high temperatures and pressures in a pasteurization process.

Heat treatment is carried out at temperatures of about 140°-220° C. and exposure time is relatively short. However, it is generally desirable to conduct the heat treatment for a period of time sufficient to produce a degree of crystallinity in the finished product which is preferably at least about 30 percent up to 50 percent or more, the maximum attainable crystallization for polyethylene terephthalate being about 60 percent. In general, especially good results have been observed when this heat treatment step is carried out for a period of about 0.1 to 600 seconds. The upper limit of this treatment is not particularly critical, other than from an economical viewpoint, and a duration of treatment of up to 100 minutes is possible.

The thermoplastic slug useful in the present invention is hollow, but the term "hollow," unless otherwise indicated, is meant to include a tubelike slug having both ends open, or a tubelike slug having one end open and one end closed, i.e., a blind slug, wherein the slug is so positioned in the extrusion barrel that the closed end will form the bottom of the bottle. The tubelike slug having both ends open can be used with the apparatus incorporating a stationary center rod or a moving center rod but a blind slug can only be used with the apparatus incorporating a movable center rod.

The slug is preferably fabricated by conventional extrusion or injection molding methods from thermoplastic materials which are susceptible to increased strength or reinforcement when biaxially oriented. The slug itself can be oriented or unoriented prior to use. If an oriented slug is used, further orientation occurring in the extrusion drawing and expansion of the extruded slug is additive in effect. In addition, the slug should be practically amorphous with no more than about 5 percent crystallinity and clear in appearance. This will result in a clear formed bottle. If it is intended that the bottle be colored, however, the coloring agent such as a dye can be added to the slug forming polymer and, of course, result in a colored slug.

The dimensions of the slug to be used are determined by many factors including the desired thickness and the desired degree of orientation. Typically the slug is hollow and the radial dimensions are slightly smaller than the dimensions of the neck of the bottle to be formed as can be seen in the drawings. The axial length of the slug is slightly shorter than the dimension between the top and the center of the bottom as measured along the outside of the bottle to be formed. To improve the dimensional stability of the bottle, particularly the radial dimensions of the neck of the bottle, the slug is initially formed with substantially oversized radial dimensions, quenched to a temperature below the crystalline melt point of the polymer, then forced through a reducing die slightly smaller than the radial dimensions of the neck of the bottle as shown in the drawings. For still further improved dimensional stability, the slug can be compressed in a chamber maintaining the same outside diameter with a tapering mandrel in the center of the compression chamber resulting in a very short slug having an outside diameter slightly smaller than the outside diameter of the neck of the bottle and an inside diameter of practically zero resulting in a very narrow hollow space about the size of a pin hole running through the center of the slug. The compressed slugs are used in the apparatus described above without the presence of the center rod or with the center rod fully retracted.

The process and apparatus of this invention can be used to prepare articles of various shapes and sizes from various thermoplastic materials. The preferred thermoplastic material is polyethylene terephthalate, and copolymer blends thereof.

One reason polyethylene terephthalate is preferred is because when oriented, it exhibits excellent strength, creep resistance, and a low permeation factor, particularly with respect to carbon dioxide, oxygen and water vapor, making it excellently suited for use as a container for liquids bottled under pressure, such as sodas, beer, or aerosols. When forming with polyethylene terephthalate, it is advantageous to start with essentially amorphous material, i.e., crystallinity no greater than 5 percent in order to produce a clear bottle. Useful polyethylene terephthalate polymers have an inherent viscosity (1 percent concentration of polymer in a 37.5/62.5 weight percent solution of tetrachloroethane/phenol, respectively, at 30° C.) of at least 0.55. Preferably, the inherent viscosity is at least 0.7, because this produces a bottle having significantly improved toughness properties, e.g. increased impact resistance.

Impact resistance is measured by dropping a slug from various heights onto a concrete floor. In a drop test carried out on 6-inch-long, amorphous polyethylene terephthalate having an inherent viscosity of about 1.1 wherein three slugs were used in testing having an average wall thickness in mils of about 138, 90, and 93, with a weight in grams of 27.8, 21.2, and 21.6, respectively, each slug sustained two drops from a height of 1 foot, 2 feet, 5 feet and 8 feet without any apparent damage to the slug and, in addition, each slug sustained the impact of a 5-pound weight dropped two times onto the slug from a height of one foot.

Other useful thermoplastic materials include copolymers of acrylonitrile/styrene/acrylate; acrylonitrile/methacrylate; methacrylonitrile copolymers; polycarbonates; polybis(para-aminocyclohexyl) dodecaneamide and other poly-amides; polyformaldehyde; high density polyethylene; polypropylene; other polyesters and polyvinyl chloride.

Laminar-walled bottles or the like can be produced by the process of this invention by employing a laminar-walled hollow cylindrical slug. Laminar-walled slugs are obtained by coaxially laminating two or more slugs of the same or different thermoplastic composition. Examples of practical combinations include polyethylene terephthalate on the inside coaxially laminated to polyvinylidene chloride copolymer or hydrolyzed ethylene vinyl acetate copolymer on the outside. Slugs of multi-polymer composition can be co-extruded in two or more layers, i.e., preferably in three layers, with the additive polymer sandwiched between the base or bottle-making layers of polymer. Through the use of such a slug, it is possible to produce bottles of base resins with a selected lamina to be used as (1) a gas barrier, (2) coloring layer, or (3) degrading catalyst.

The extruded slug must be at a temperature within its range of biaxial orientation, i.e., the temperature range for the polymer being used wherein orientation can occur without line drawing. The heat generated during extrusion is generally sufficient for this purpose so that the slug can be extruded at room temperature. However, the orientation temperature range varies from polymer to polymer, depending on such factors as crystallinity, and the glass transition temperature of the polymer. If the orientation range of the polymer is so high that the heat of extrusion is not sufficient to raise the polymer temperature to its orientation range, then the slug can be preheated before extrusion.

The thermoplastic article formed is biaxially oriented and will have physical properties consistent with the type slug used.

The following examples illustrate the present invention. All parts, precentages and proportions are by weight unless otherwise indicated.

EXAMPLE 1

Polyethylene terephthalate polymer of inherent viscosity about 0.96 is made into a hollow cylindrically amorphous shaped slug 4.5 inches long, 0.680 inch outside diameter (O.D.) and 0.375 inch inside diameter (I.D.), weighing about 22.6 grams. The slug is preheated to about 92° C. and extruded through gap "T" of about 0.033 inch at a barrel temperature of about 85° C. in the apparatus described above. The velocity of the ram 15 is about 3.6 inches per second and the velocity of the mold 6 is about 5.1 inches per second. Air at about 255 psig pressure is introduced through ports 9 and 10. The internal mold diameter is about 2.5 inches.

A bottle is formed having a wall thickness of about 11.4 mils; the axial tensile strength is about 16,500 psi and the hoop tensile strength is about 26,700 psi.

EXAMPLE 2

Example 1 is repeated except as follows:

| | |
|---|---|
| Inherent viscosity | 1.0 |
| Slug length | 6.5 inches |
| Slug O.D. | 0.680 inch |
| Slug I.D. | 0.477 inch |
| Slug weight | 23.5 grams |
| Preheat temp. | 100°C. |
| Barrel temp. | 90°-100°C. |
| Gap | 0.035 inch |
| Ram velocity | 5 in./sec. |
| Mold velocity | 5.8 in./sec. |
| Air Pressure | 350 psi |
| Tensile (axial) | 8,000 psi |
| Tensile (hoop) | 30,300 psi |

Wall thickness 16.8 mils

EXAMPLE 3

A thermoplastic bottle is produced according to the procedure of Example 1, namely extruding and blow-molding a hollow cylindrically shaped slug 4.5 inches long with an outside diameter of 0.680 inch and an inside diameter of 0.375 inch weighing about 22.6 grams. The slug is made from polyethylene terephthalate which has an inherent viscosity of 0.91. The slug has a density on the outside surface of 1.332 and on the inside surface of 1.334, and a crystallinity of about 5 percent.

The bottle exhibits the following properties:

I Density and Crystallinity of Polymer from Various Points on the Bottle

|  | Density | Crystallinity % |
|---|---|---|
| Neck | 1.332 | 0 |
| Top of major cylindrical section | 1.345 | 6 |
| Middle of major cylindrical section | 1.356 | 17 |
| Bottom of major cylindrical section | 1.361 | 22 |
| Bottom of bottle | 1.332 | 0 |

II Tensile Properties (Right Cylinder Section)

|  | Axial | Hoop |
|---|---|---|
| Tensile strength (kpsi) | 7.8 | 23.8 |
| Elongation (%) | 59 | 17 |
| Tensile modulus (kpsi) | 246 | 683 |
| Yield stress (kpsi) | 7.6 | 10 kpsi |

III Biaxial Orientation (Right Cylinder Section)
X-Ray Orientation Angles

| $2\theta$ peak | direction of rotation $\chi$(chi) $\phi$(phi) | Orientation Angle | Peak Max. |
|---|---|---|---|
| 17.0 | plane perpendicular to beam | 83 (Axial) | 0°X |
| | plane parallel to beam | | |
| | Scan 90 | 52 (Hoop) | 0°X |
| | 0 Scan | 66 (Hoop) | 0°X |
| 27.0 | Plane perpendicular to beam | | |
| | Scan 0 | -- | -- |
| | Plane parallel to beam | | |
| | Scan 90 | 32 (Hoop) | 5°X |
| | 0 Scan | 40 (Hoop) | 87°$\phi$ |

Considering the X-ray orientation angles and the tensile properties above, the bottle exhibits an effective stretch ratio of about 3.5 times in the hoop direction and about 1.25 times in the axial direction.

IV Permeability (Right Cylinder Section)

| Shell Thickness | 18 mils |
| Water Loss | 0.6 mg/hr |

Bottle filled with water stored at 17.5% relative humidity, 25°C. for 13 days

| Carbon Dioxide Loss | 1.5 cc/day (standard temperature and pressure) |

Bottle pressurized with carbon dioxide to a pressure of 40 psig at 25°C. Bottle has no permanent deformation V Creep
Circumferential strips from the right cylinder section of a sacrificed bottle at 50° C. resist a hoop tensile stress of 5,000 psi with creep at 100 hours at a value less than 2 percent and long term creep of 90 days, less than 5 percent. This corresponds to a deformation constant of about 1.5.

As many widely different embodiments of this invention may be made without departing from the spirit and scope thereof, it is to be understood that this invention is not limited to the specific embodiments thereof except as defined in the appended claims, and all changes which come within the meaning and range of equivalence are intended to be embraced herein.

We claim:

1. An apparatus for forming a thermoplastic article from a blind, hollow, cylindrical thermoplastic slug comprised of:

a. a slidable mold having a cavity shaped to produce the article;

b. an annular extrusion orifice located within the mold cavity wherein the extrusion orifice is formed by the confronting end portions of a stationary annular extrusion barrel having an internal bore for receiving the blind slug and a stationary mandrel in axial alignment with the extrusion barrel;

c. means for extruding the slug open end first through the annular extrusion orifice into the mold wherein the extrusion means includes a movable center rod in axial alignment with and contained within the mandrel and the extrusion barrel forming a close-fitting extrusion chamber in the extrusion barrel wherein the hollow slug can be placed in the extrusion chamber with the center rod running into the hollow slug contacting the inside surface of the slug to support the walls of the slug during extrusion and an extrusion ram inside of the extrusion barrel to contact the outside surface of the blind end of the slug and force the slug out through the extrusion orifice while simultaneously moving the center rod inside of the slug into the mandrel in the direction of extrusion;

d. means in the mold to accept and hold the extrudate at one end of the mold cavity;

e. means for sliding the mold from a first location to a second location relative to the extrusion orifice while the slug is continuously extruded, drawing the extruded slug into the interior of the mold forming a hollow shell out of the extrudate; and f. means for introducing a fluid under pressure against the interior of the hollow shell, while the slug is simultaneously being extruded and drawn, to expand the hollow shell of extrudate against the interior of the mold.

2. The apparatus of claim 1 in which the mold has a cavity shaped to reproduce a generally cylindrical bottle.

3. The annular extrusion orifice of claim 1 formed by the confronting end portions of the extrusion barrel and the mandrel wherein the confronting end portions have a curving shape so that in the cross-sectional profile, taken coplanar with the central axis of extrusion, the annular orifice in the direction of extrusion is area convergent.

4. The annular extrusion orifice of claim 3 wherein the cross-sectional area of the annular orifice, taken perpendicular to the central axis of extrusion, remains the same in value in the direction of extrusion.

5. The annular extrusion orifice of claim 3 wherein the cross-sectional area of the annular orifice, taken perpendicular to the central axis of extrusion, decreases in value in the direction of extrusion.

6. The apparatus of claim 1 in which the means for introducing a fluid into the interior of the hollow shell is a mandrel of uniform external diameter positioned within the mold and axially aligned with the extrusion barrel and having an internal fluid passageway terminating in exhaust ports located at the end of the mandrel next adjacent the annular orifice.

7. The apparatus of claim 1 including additional means to reverse the direction of the sliding mold after completion of drawing and expanding the extrudate, forming a recess in the bottom of the article.

8. The apparatus of claim 1 including means for varying the speed of the mold.

9. The apparatus of claim 1 including means for varying the rate of extrusion.

10. The apparatus of claim 1 including means for simultaneously varying both the speed of the mold and the rate of extrusion.

11. The apparatus of claim 1 including means for cooling the mold.

12. The apparatus of claim 1 including means to preheat the slug before the slug is extruded.

13. An apparatus for forming a thermoplastic article from a hollow, cylindrical thermoplastic slug having both ends open comprised of:
   a. a slidable mold having a cavity shaped to produce the article;
   b. an annular extrusion orifice located within the mold cavity wherein the annular extrusion orifice is formed by the confronting end portions of a stationary extrusion barrel having an internal bore for receiving the hollow thermoplastic slug, and a stationary mandrel in axial alignment with the extrusion barrel
   c. means for extruding the slug open end first through the annular extrusion orifice wherein the extrusion means includes a center rod in axial alignment with and contained within the extrusion barrel forming a close-fitting extrusion chamber wherein the hollow slug can be placed in the extrusion chamber with the center rod running through the hollow slug to support the walls of the slug during extrusion, and a ram inside of the extrusion barrel to contact the slug and force the slug around the center rod through the extrusion orifice without moving the center rod,
   d. means in the mold to accept and hold the extrudate at one end of the mold cavity;
   e. means for sliding the mold from a first location to a second location relative to the extrusion orifice while the slug is continuously extruded, drawing the extruded slug into the interior of the mold forming a hollow shell out of the extrudate; and
   f. means for introducing a fluid against the interior of the hollow shell while the slug is simultaneously being extruded and drawn to expand the hollow shell of extrudate against the interior of the mold.

14. The apparatus of claim 13 for forming a thermoplastic article from a hollow, cylindrical thermoplastic slug having both ends open and including additional means to withdraw the center rod and means to urge the trailing edges of the slug radially inward to the bottom center of the article forming an integral closure.

15. The apparatus of claim 13 in which the mold has a cavity shaped to reproduce a generally cylindrical bottle.

16. The apparatus of claim 13 wherein the annular extrusion orifice is formed by (a) a stationary extrusion barrel having an internal bore for receiving the hollow thermoplastic slug, (b) a stationary mandrel in axial alignment with and confronting the extrusion barrel wherein the annualr extrusion orifice is formed by the confronting end portions of the extrusion barrel and the mandrel.

17. The annular extrusion orifice of claim 13 formed by the confronting end portions of the extrusion barrel and the mandrel where the confronting end portions have a curving shape so that in the cross-sectional profile, taken parallel to the central axis of extrusion the annular orifice in the direction of extrusion is area convergent.

18. The annular extrusion orifice of claim 13 wherein the cross-sectional area of the annular orifice, taken perpendicular to the central axis of extrusion, remains the same in value in the direction of extrusion.

19. The annular extrusion orifice of claim 13 wherein the cross-sectional area of the annular orifice, taken perpendicular to the central axis of extrusion, decreases in value in the direction of extrusion.

20. The apparatus of claim 13 wherein the annular extrusion orifice and the means for extruding the hollow thermo-plastic slug are:
   a. a stationary annular extrusion barrel having an internal bore for receiving the slug,
   b. a stationary mandrel in axial alignment with the extrusion barrel and confronting the extrusion barrel,
   c. an annular extrusion orifice formed by the confronting end portions of the extrusion barrel and the mandrel,
   d. a movable center rod in axial alignment with and contained within the mandrel and the extrusion barrel forming a close-fitting extrusion chamber in the extrusion barrel wherein the hollow slug can be placed in the extrusion chamber with the center rod running into the hollow slug contacting the inside surface of the slug to support the walls of the slug during extrusion, and
   e. an extrusion ram inside of the extrusion barrel to contact the slug and force the slug out through the extrusion orifice while simultaneously moving the center rod inside of the slug into the mandrel in the direction of extrusion.

21. The apparatus of claim 13 in which the means for introducing a fluid into the interior of the hollow shell is a mandrel of uniform external diameter positioned within the mold and axially aligned with the extrusion barrel and having an internal fluid passageway terminating in exhaust ports located at the end of the mandrel next adjacent the annular orifice.

22. The apparatus of claim 13 including additional means to reverse the direction of the sliding mold after completion of drawing and expanding the extrudate, forming a recess in the bottom of the article.

23. The apparatus of claim 13 including means for varying the speed of the mold.

24. The apparatus of claim 13 including means for varying the rate of extrusion.

25. The apparatus of claim 13 including means for simultaneously varying both the speed of the sliding mold and the rate of extrusion.

26. The apparatus of claim 13 including means for cooling the mold.

27. The apparatus of claim 13 including means to preheat the slug before the slug is extruded.

28. An apparatus for forming a thermoplastic article from a blind, hollow thermoplastic slug comprised of:
   a. a slidable mold having a cavity shaped to produce the article;
   b. an annular extrusion orifice located within the mold cavity wherein the extrusion orifice is formed by the confronting end portions of a stationary annular extrusion barrel having an internal bore for receiving the blind slug and a stationary mandrel in axial alignment with the extrusion barrel;
   c. means for extruding the slug into the mold wherein the means comprises a movable center rod in axial alignment with and contained within the mandrel and the extrusion barrel, forming a close-fitting extrusion chamber in the extrusion barrel wherein the hollow slug can be placed in the extrusion chamber with the center rod running into the hollow slug contacting the inside surface of the slug to support the walls of the slug during extrusion and an extrusion ram inside of the extrusion barrel to contact the outside surface of the blind end of the slug and force the slug out through the extrusion orifice while simultaneously moving the center rod inside of the slug into the mandrel in the direction of extrusion;
   d. means for sliding the mold from a first location to a second location relative to the extrusion orifice while the slug is continuously extruded, drawing the extrudate into the interior of the mold forming a hollow shell out of the extrudate; and
   e. means for introducing a fluid against the interior of the hollow shell while the slug is simultaneously being extruded and drawn to expand the hollow shell of extrudate against the interior of the mold.

29. The apparatus of claim 28 for forming a thermoplastic article from a hollow thermoplastic slug having both ends open including the addition of means to urge the trailing edges of the slug radially inward to the bottom center of the article forming an integral closure.

30. An apparatus for forming a thermoplastic article from a hollow thermoplastic slug comprised of:
   a. a mold having a cavity shaped to produce the article;
   b. an annular extrusion orifice located within the mold cavity wherein the extrusion orifice is formed by the confronting end portions of an annular extrusion barrel having an internal bore for receiving the slug and a mandrel in axial alignment with the extrusion barrel;
   c. means for extruding the slug through the annular extrusion orifice into the mold wherein the extrusion means includes a center rod in axial alignment with and contained within the extrusion barrel, forming a close-fitting extrusion chamber in the extrusion barrel wherein the hollow slug can be placed in the extrusion chamber with the center rod running into the hollow slug contacting the inside of the slug to support the walls of the slug during extrusion and an extrusion ram inside of the extrusion barrel to contact one end of the slug and force the slug through the extrusion orifice;
   d. means for relative sliding movement between the mold and the extrusion orifice while the slug is continuously extruded, drawing the extrudate into the interior of the mold forming a hollow shell out of the extrudate; and
   e. means for introducing a fluid under pressure against the interior of the hollow shell, while the slug is simultaneously being extruded and drawn, to expand the hollow shell of extrudate against the interior of the mold.

31. An apparatus for forming a thermoplastic article from a blind, hollow thermoplastic slug comprised of:
   a. a mold having a cavity shaped to produce the article;
   b. an annular extrusion orifice located within the mold cavity wherein the extrusion orifice is formed by the confronting end portions of an annular extrusion barrel having an internal bore for receiving the blind slug and a mandrel in axial alignment with the extrusion barrel;
   c. means for extruding the slug into the mold wherein the means comprises a movable center rod in axial alignment with and contained within the mandrel and the extrusion barrel, forming a close-fitting extrusion chamber in the extrusion barrel wherein the hollow slug can be palced in the extrusion chamber with the center rod running into the hollow slug contacting the inside surface of the slug to support the walls of the slug during extrusion and an extrusion ram inside of the extrusion barrel to contact the outside surface of the blind end of the slug and force the slug out through the extrusion orifice;
   d. means for relative sliding movement between the mold and the extrusion orifice while the slug is continuously extruded, drawing the extrudate into the interior of the mold forming a hollow shell out of the extrudate; and
   e. means for introducing a fluid under pressure against the interior of the hollow shell, while the slug is simultaneously being extruded and drawn, to expand the hollow shell of extrudate against the interior of the mold.

* * * * *